Patented Nov. 15, 1927.

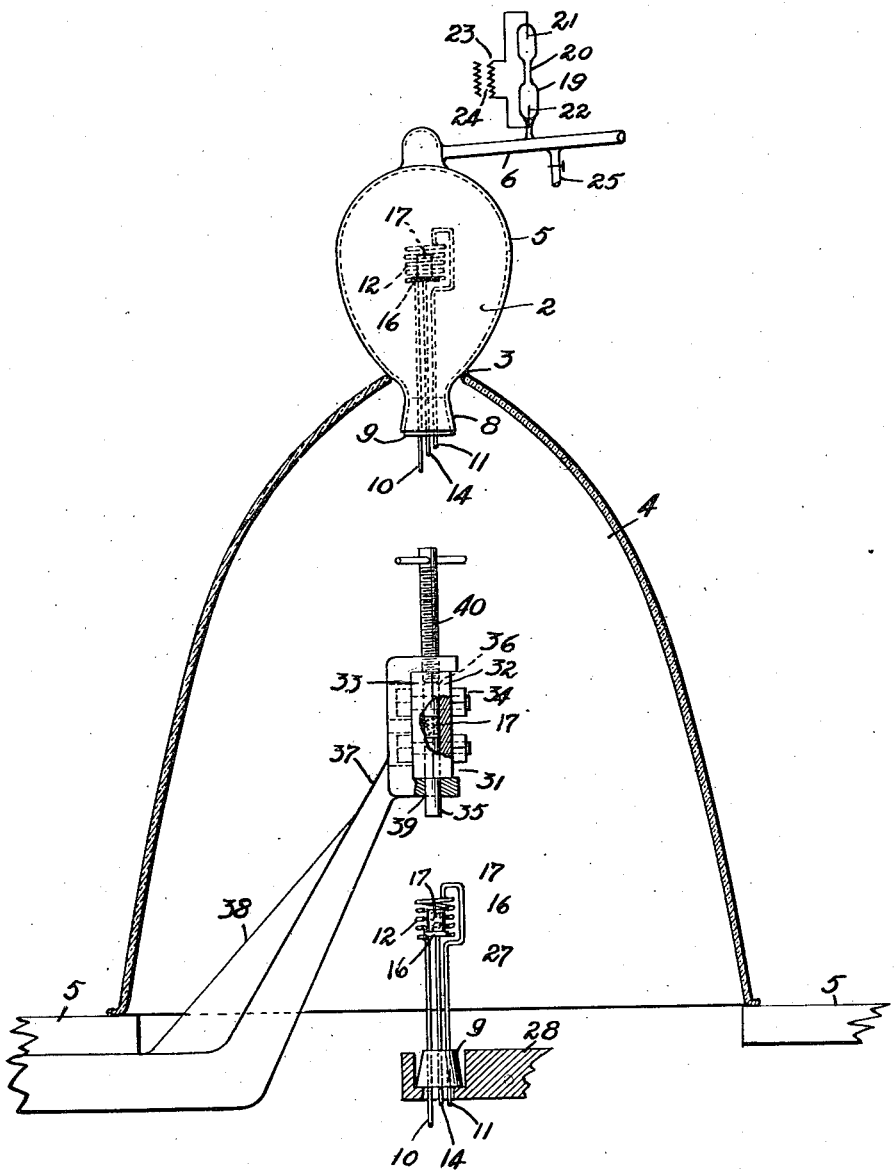

1,648,962

UNITED STATES PATENT OFFICE.

HARVEY CLAYTON RENTSCHLER AND JOHN WESLEY MARDEN, OF EAST ORANGE, NEW JERSEY, ASSIGNORS TO WESTINGHOUSE LAMP COMPANY, A CORPORATION OF PENNSYLVANIA.

METHOD OF PREPARING URANIUM IN A COHERENT MASS.

Application filed August 22, 1922. Serial No. 583,555.

This invention relates to a method for the metallurgical treatment of uranium.

An object of the invention is the provision of a method whereby uranium may be prepared in the form of a dense, coherent mass of a size suitable for commercial use.

Other objects of the invention may be perceived from a reading of the following specification.

In a copending application Serial No. 583,375, filed August 21, 1922, metallurgical method (W. L. 193), and assigned to the Westinghouse Lamp Company, a method is described and claimed whereby uranium may be reduced from certain of its compounds and also obtained as an agglomerated mass. Briefly, this method comprises reducing a halide of uranium by means of an alkaline earth halide and an alkali metal, the reduction being effected in a vessel adapted to exclude atmosphere, subsequently isolating the uranium powder in a manner which keeps the uranium in a pure state and finally compressing the uranium while protecting it from the action of the atmosphere.

Subsequent treatment of the compressed body of uranium, which will hereinafter be described, comprises withdrawing it from a mold or container in such manner that it may not be exposed to the action of the atmosphere until it has been produced in a solid homogeneous mass and finally giving it a special heat treatment.

The preferred method of manipulation to secure the desired end will now be described and, in order to better understand the same, reference should be had to the accompanying drawing, the single figure of which is a partially diagrammatic, partially side elevational and partially sectional view of an apparatus for practicing our process.

The apparatus shown in the drawing comprises a high-frequency induction furnace 2, encircling and in contact with the lower end of which is the periphery 3 of the upper opening of a bell jar 4 which is preferably of glass and which rests on supports 5. The high-frequency induction furnace 2 is that known as the Rentschler furnace and is described and claimed in a copending application 430,118, filed December 13, 1920, by H. C. Rentschler and assigned to the Westinghouse Lamp Company.

The furnace itself, apart from its auxiliary apparatus, is shown, partly in section, in the accompanying drawing, and comprises a glass envelope 5 which may be equivalent to a sphere of approximately 11″ in diameter provided with a ¾″ diameter tube 6, which may be ¾″ in diameter, opening thereinto which may be connected to means (not shown) such, for example, as a diffusion pump, for exhausting the envelope 5 to the highest degree of vacuum. The lower portion, or neck 8, of the envelope 5 is provided with a removable ground glass stopper 9 which is closely fitted therein and is sealed to the neck 8 by any suitable means for excluding the atmosphere, for example, as by a wax. Wires 10 and 11 are fused into the stopper 9, the ends of said wires being secured to a closely-wound helix or coil 12 centrally located within the envelope 5 and which may have a diameter of 1¼″ and a height of 1¾″, although the dimensions given in this application are not essential, but merely an example of the size of the apparatus which may be employed. The coil 12, which will be termed hereinafter the primary coil, has its turns lying closely adjacent to each other and forms, in effect, a hollow body or a wall to almost completely enclose the secondary circuit which is the mass of uranium to be treated, and, because of its construction and close association therewith, reflects any heat radiated by the secondary.

A metal support 14, insulated from wires 10 and 11 and from coil 12, is also fused into the stopper 9 and has a platform 16 of refractory metal such, for example, as tungsten, secured to the upper end thereof, the platform being entirely contained within the coil 12 and closely spaced therefrom. The material 17 to be heat treated may be of any convenient dimensions, for example, it may be a cylindrical body 1⅛″ in diameter and ⁹⁄₁₆″ in height and may be placed upon the ⁹⁄₁₆″ in height and may be placed upon the platform 16 before the latter is placed in position within the envelope of the furnace.

In communication with the space within the envelope 5 is disposed an electric discharge vessel 19 such, for example, as a spectrum tube, having a capillary tube 20 of any convenient size, for example of 2 mms. diameter and 1½″ length and electrodes 21 and 22 which are connected to the high-tension secondary 23 of a transformer 24. In communication also with the space within the envelope 5 is a tube 25 which may be sealed to an opening made in the exhaust tube 6, the purpose of the tube 25 being to admit a supply of inert gas, as hereinafter explained.

Before introducing a mass of uranium into the furnace, the stopper 9 and the parts sealed thereto are removed from the remaining parts of the furnace and brought into position, as shown at 27, within the bell jar and may be there supported on a member 28. An inert gas, such, for example, as dry nitrogen, is then allowed to flow through the tube 25 into the furnace, pass through the lower end thereof and also through the bell jar 4 attached to the furnace. The flow of nitrogen is allowed to continue until practically all of the atmosphere is excluded from the furnace and the bell jar. The body of uranium, as contained in a closed vessel, is then brought within the bell jar 4.

As shown in the drawing, the uranium is a compressed mass 17 contained within a mold 31 consisting of two iron members 32 and 33 each provided with longitudinal semi-circular grooves adapted to be bolted together by means of bolts 34 so that the semi-circular grooves ore joined to form a cylindrical opening, into both ends of which are inserted plungers 35 and 36.

The mold 31 may be held in a bracket 37 which is supported by an arm 38. The bracket 37, which has an opening 39 in the lower end thereof and a screw plunger 40 disposed in a threaded aperture in its upper end, is placed in such relation to the mold 31 that the screw plunger 40 may be used, after the bolts 34 have been loosened, to expel the lower plunger 35 and the mass of uranium 17 from the mold and through the opening 39 of the bracket 37. The uranium, upon emerging from the bracket 37 may be grasped and placed on the platform 16 within the induction coil 12.

The mold 31, the bracket 37 and its arm 38 may then be removed from the bell jar 4, after which the mass of uranium 17, with the accompanying parts of the furnace, is raised into normal position within the envelope of the furnace. After the stopper 9 has been sealed so as to make an air-tight joint with the furnace envelope 5, the supply of nitrogen from tube 25 may be discontinued, and the bell jar 4 may be removed from contact with the furnace. The furnace is then preferably exhausted to the highest possible degree of vacuum by the best modern means, such, for example, as a diffusion pump or a plurality of the same.

A current of low value, in its nature either direct or low-frequency alternating, is then passed through the primary coil 12 in order to gradually heat the mass by radiation. A vital feature of this step in the heat treatment of the uranium consists in raising the temperature at a rate not exceeding that at which substantially all gases and vapors are expelled from the uranium without disintegrating the same.

While this step is being performed, a high potential, which may be 3400 volts, is impressed on the terminals of the discharge tube 19. As the mass becomes heated gradually to higher temperatures, by an increase of the current through the primary 12, gas will be evolved from the uranium. The presence of an objectionable quantity of this gas may be indicated by a discharge taking place through the tube 22.

As soon, therefore, as a visible discharge passes through the tube 19, the current through the primary is diminished until the discharge ceases, so as to avoid driving off the gases from the uranium too rapidly, since a rapid evolution of gas may cause the mass of uranium to be disintegrated into two or more parts. The current through the primary coil 12 is gradually raised until it reaches a dull-red heat, the time required to reach this temperature depending upon the amount of gas or vapor in the metal which is being treated.

When the mass of uranium gives off substantially no more gas under this treatment, as may be indicated by no discharge occurring in the tube 19, the current first used to heat the primary is turned off, and high-frequency current is passed through the primary coil in such manner that the uranium metal is heated slowly by induced secondary currents. The apparatus and procedure for accomplishing this is described in the above mentioned copending application. If any gas is liberated during this heating, which may be noted by the discharge through the tube 19, the high-frequency current must be diminished so that, at no time, is there more than a faint discharge through the tube 19.

During this part of the process, it may be noted that, when the temperature of the uranium has been increased, small beads exude from the metal being treated and remain on the surface thereof. These beads probably consist of iron or other impurity which has not been previously entirely removed from the powder. If these beads make their appearance, care must be taken to increase the temperature very slowly until they are volatilized.

After removing the iron in the manner just described, the high-frequency current is increased in value until the uranium is raised to a white heat. This temperature of the metal should be maintained until such time as the particles thereof sinter together or coalesce and form a dense, coherent mass of metal, which is homogeneous throughout, that is, substantially free from air pockets or voids.

Modifications of the method described may be employed for producing uranium in the coherent state but such modifications are included in the appended claims.

What is claimed is:

1. The method of producing uranium in a coherent condition which comprises pressing uranium powder into a compact body and transferring the compact body of uranium into a furnace from an inert environment and heating said uranium in a vacuum to a temperature not less than the sintering temperature thereof.

2. The method of producing coherent uranium which comprises pressing uranium powder into a compact body in a closed vessel, withdrawing said body from the closed vessel, in an inert environment, introducing said body, while still protected by an inert environment, into a heat treating furnace which maintains the purity of said uranium, evacuating said furnace, heating said body of uranium at such rate that the occluded gases therein may be expelled without causing the disintegration of said body, continuing the heat treatment of said uranium to at least its sintering temperature and maintaining the same until a coherent body is obtained.

3. The method of producing coherent uranium which comprises pressing uranium powder into a compact body in a closed vessel, withdrawing said body from the closed vessel in an inert environment, introducing said body, while still protected by an inert environment, into a heat-treating furnace which maintains the purity of said uranium, evacuating said furnace to the highest possible degree, heating said body of uranium first by radiation and then by high frequency induction currents at such rate that the gases evolved therefrom may not disintegrate the body of uranium and continuing the heat treatment until the particles thereof coalesce and form a coherent mass.

4. The method of producing coherent uranium which comprises pressing uranium powder into a compact body in a closed vessel, withdrawing said body from the closed vessel in an atmosphere of inert gas, introducing said body, while still protected by said gas, into a heat treating furnace, evacuating said furnace to the highest possible degree, heating said body of uranium at such rate that the occluded gases therein may be expelled without causing the disintegration of said body, continuing this step in the manner described until substantially all occluded gases and other volatilizable impurities have been expelled from said body, raising the temperature of said body to a white heat and finally heating said body of uranium to at least its sintering temperature.

5. The method of producing coherent uranium which comprises pressing uranium powder into a compact body in a closed vessel, withdrawing said body from the closed vessel, in an inert environment, introducing said body, while still protected by an inert environment, into a heat treating furnace, evacuating said furnace, heating said body of uranium to a red heat by high-frequency induction currents at a rate which preserves the integrity of said body of uranium, continuing the heating of said uranium to expel volatilizable impurities at a rate which avoids the disintegration of said uranium, heating said uranium to a white heat and finally raising its sintering temperature to at least a sintering point.

In testimony whereof, we have hereunto subscribed our names this 21st day of August, 1922.

HARVEY CLAYTON RENTSCHLER.
JOHN WESLEY MARDEN.